US009874262B2

(12) United States Patent
Schimetka

(10) Patent No.: US 9,874,262 B2
(45) Date of Patent: Jan. 23, 2018

(54) PROTECTIVE DEVICE FOR A SHOCK ABSORBER

(71) Applicant: SAF-HOLLAND GmbH, Bessenbach (DE)

(72) Inventor: Thomas Schimetka, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/128,513

(22) PCT Filed: Mar. 16, 2015

(86) PCT No.: PCT/EP2015/055402
§ 371 (c)(1),
(2) Date: Sep. 23, 2016

(87) PCT Pub. No.: WO2015/144471
PCT Pub. Date: Oct. 1, 2015

(65) Prior Publication Data

US 2017/0276207 A1 Sep. 28, 2017

(30) Foreign Application Priority Data

Mar. 25, 2014 (DE) ........................ 10 2014 205 501

(51) Int. Cl.
*F16F 9/38* (2006.01)

(52) U.S. Cl.
CPC ............ *F16F 9/38* (2013.01); *F16F 2230/10* (2013.01)

(58) Field of Classification Search
CPC ................................ F16F 9/38; F16F 2230/10
USPC ..................................................... 188/322.12
See application file for complete search history.

(56) References Cited

U.S. PATENT DOCUMENTS 4,167,991 A * 9/1979 Karklins .................. F16F 9/38 188/322.12
4,167,992 A * 9/1979 McClellan ................ F16F 9/38 188/322.12
4,199,855 A * 4/1980 McClellan ............. B23P 11/00 29/450
4,372,429 A * 2/1983 Marx ........................ F16F 9/38 188/322.12
6,706,968 B2 3/2004 Yaworski et al.
(Continued)

FOREIGN PATENT DOCUMENTS

DE 875767 7/1949
DE 43 27 915 3/1995
(Continued)

OTHER PUBLICATIONS

European Patent Office; International Search Report; dated Jun. 25, 2015.

*Primary Examiner* — Thomas Irvin
(74) *Attorney, Agent, or Firm* — Price Heneveld LLP

(57) ABSTRACT

The invention relates to a protective device for a shock absorber, in particular a commercial vehicle shock absorber, comprising a first base area and a second base area, wherein the first base area and the second base area are connected to one another in such a way that via a swivel axis they can be swiveled in relation to one another between an assembly state and an operating state, and wherein the first base area and the second base area in the operating state substantially form a hollow cylindrical shape.

25 Claims, 3 Drawing Sheets

22
20
16
18
2
10
8
X
12
4
14

(56) References Cited

U.S. PATENT DOCUMENTS

| | | | | |
|---|---|---|---|---|
| 7,083,028 | B2 * | 8/2006 | Fujita | F16F 9/38 188/321.11 |
| 7,392,736 | B2 * | 7/2008 | Fenn | F16F 9/38 188/322.12 |
| 7,637,520 | B2 * | 12/2009 | Madden | B62J 23/00 180/219 |
| 7,958,980 | B2 * | 6/2011 | Seino | E02F 9/2271 188/322.12 |
| 9,657,801 | B2 * | 5/2017 | Hansen | F16F 9/38 |
| 2007/0089951 | A1 | 4/2007 | Skiba | |
| 2008/0265475 | A1 | 10/2008 | Keeney et al. | |
| 2009/0050426 | A1 * | 2/2009 | Handke | F16F 9/38 188/322.12 |
| 2010/0044965 | A1 | 2/2010 | Lou | |
| 2016/0115975 | A1 * | 4/2016 | Oberender | F16F 9/0218 92/117 A |

FOREIGN PATENT DOCUMENTS

| | | | | |
|---|---|---|---|---|
| DE | 100 41 927 | | 3/2001 | |
| DE | 10 2009 051 456 | | 5/2010 | |
| DE | 20 2009 007 569 | | 11/2010 | |
| EP | 1845279 | A1 * | 10/2007 | F16F 9/38 |
| EP | 2 256 365 | | 12/2010 | |
| GB | 868226 | | 5/1961 | |
| KR | 20110126783 | | 11/2011 | |

* cited by examiner 12
6
6
X
2
12
10
24
4
6
10

X
26
4
10
12
6
Y
2
14

PROTECTIVE DEVICE FOR A SHOCK ABSORBER

BACKGROUND OF THE INVENTION

The present invention relates to a protective device for a shock absorber, in particular a commercial vehicle shock absorber protective device, and to a shock absorber arrangement, in particular a commercial vehicle shock absorber arrangement, which comprises a protective device for the piston portion of the shock absorber.

Protective devices of said type are known from the state of the art. Thus DE 875 767, for example, discloses a tubular dust protection, which encloses the upper end of a coil spring, which extends around the shock absorber cylinder. A disadvantage with such protective devices, however, is that fitting the protective devices to the shock absorber is costly and complicated.

An object of the present invention, therefore, is to provide a protective device for a shock absorber, in particular a commercial vehicle shock absorber, and a shock absorber arrangement, in particular a commercial vehicle shock absorber arrangement, which are easy to fit and which ensure high operating reliability and a long service life.

SUMMARY OF THE INVENTION

According to the invention a protective device for a shock absorber, in particular a commercial vehicle shock absorber, is provided, comprising a first base area and a second base area, wherein the first base area and the second base area are connected to one another in such a way that via a swivel axis they can be swiveled in relation to one another between an assembly state and an operating state, and wherein the first base area and the second base area in the operating state substantially form a hollow cylindrical shape. The protective device according to the invention is particularly advantageous in being suited to a shock absorber of a commercial vehicle, since the installed situation of shock absorbers in commercial vehicles generally allows elements such as the protective device to be arranged and fastened on the mounting eye of the piston portion, which serves for fixing the shock absorber to the chassis frame of the vehicle. The protective device comprises a first base area and a second base area, which perform the actual protective function of the protective device. In other words, the first base area and the second base area are designed in such a way that they protect the parts of the shock absorber to be duly protected—generally its exposed piston portion—from external influences. For this purpose, the first base area and the second base area are advantageously made from a material which withstands external influences, for example a plastic or a metal. The first base area and the second base area are designed to move in relation to one another, in such a way that via a swivel axis they can be swiveled between an assembly state and an operating state. In other words, the protective device can be brought into or may have an assembly state in which the protective device can be arranged on a shock absorber. From the assembly state the protective device can be brought into an operating state, in which the protective device—fixed to the shock absorber—assumes the function of protecting the shock absorber from external influences. Here the swivel axis may be arranged directly on the first base area and/or the second base area or also indirectly, separated therefrom by interposed elements. The interposed element might be a strap, for example, which connects the first base area and the second base area to one another, so that the swivel axis need not be invariably fixed in relation to the first base area and the second base area, but instead—owing to the flexibility of the strap—may be variable in its position. The main thing here, however, is that means are provided, which allow the first base area to be swiveled in relation to the second base area. In the operating state the first base area and the second base area substantially form a hollow cylindrical shape. The term “substantially” here is to be interpreted as signifying that in their operating state the first base area and the second base area together form a hollow cylindrical shape along the longitudinal or cylinder axis of the hollow cylindrical shape, at least partially, in particular predominantly over the first base area and/or the second base area. In other words, the first base area and the second base area in the operating state may also comprise portions which deviate from a hollow cylindrical shape, it being advantageous if the first base area and the second base area in the operating state predominantly have or form a hollow cylindrical shape along their cylinder axis. The cross section of the hollow cylindrical shape may be of any shape, for example polygonal, although it is particularly advantageous if it is round or circular. The hollow cylindrical shape formed by the first base area and the second base area in the operating state is open at least one end face, and the opposite end face may advantageously be at least partially closed or formed with a predominantly closed end. The first base area and/or the second base area may therefore suitably have the configuration of a dish. The fact that the first base area and the second base area can be displaced via a swivel axis between an operating state and an assembly state is especially advantageous in allowing the protective device to be easily fitted to the shock absorber, since the protective device can be snapped on over the shock absorber more or less in the assembly state and then brought into the operating state, therefore enclosing the shock absorber. Consequently, it is no longer necessary to remove the shock absorber.

The first base area and the second base area are advantageously connected via a hinge, in particular a film hinge. The hinge may be arranged on the first base area and/or the second base area by way of interposed elements. It is particularly suitable, however, if the hinge is arranged directly on the first base area and/or the second base area. An especially reliable and durable protective device can be provided if the hinge is embodied as a film hinge. This is suitably composed of a thin-walled connection between the first base area and the second base area. Film hinges are particularly preferred in an embodiment of the first base area and the second base area composed of plastic. It is especially suitable if the hinge and in particular the film hinge extends over the predominant part, advantageously over the whole of the hollow cylindrical shape formed by the base areas. The unbroken nature of the hinge affords an especially efficient protective effect, since it prevents foreign bodies getting into the interior of the protective device via the swivel axis.

The first base area and the second base area are suitably formed in one piece. This is particularly advantageous where the hinge is embodied as a film hinge, since the first base area and the second base area and the film hinge integrally formed with these areas can be formed from a plastic material. It goes without saying that further elements may be formed as separate parts on the first base area and the second base area, or may likewise be integrally formed, however, together with the first/second base area.

The swivel axis suitably lies parallel or perpendicular to the cylinder axis of the hollow cylindrical shape. In the case of a swivel axis which lies parallel to the cylinder axis of the hollow cylindrical shape, it is particularly advantageous if the swivel axis substantially corresponds to an axially running edge of the first base area and/or the second base area. Where the hinge is embodied as a film hinge, the axially running edges of the first base area and the second base area therefore correspond to the hinge and hence to the swivel axis running parallel to the hollow cylindrical shape. In an embodiment of the swivel axis perpendicular to the cylinder axis, it is particularly advantageous if, in the operating state of the first base area and the second base area, one end of the hollow cylindrical shape is substantially closed at the end face and the swivel axis is formed in this end, for example as a film hinge. It is particularly suitable in the case of a swivel axis running perpendicular to the cylinder axis if the swivel axis intersects the cylinder axis of the hollow cylindrical shape.

In a preferred embodiment the protective device comprises at least one receiving portion, which is formed on the first base area and/or the second base area for receiving a bearing area of the shock absorber. The bearing area of the shock absorber may, in particular, be the mounting eye of the piston portion of the shock absorber. The receiving portion may be provided on one of the base areas. It is preferred, however, if the first base area and the second base area each comprise a receiving portion for receiving the bearing area of the shock absorber. It is particularly advantageous if the receiving portion is configured in such a way that the bearing area of the shock absorber can extend or protrude outwards through the latter. The receiving portion can therefore advantageously provide a non-positive and/or positively interlocking connection between the protective device and the bearing area of the shock absorber, so that a displacement of the protective device relative to the shock absorber can be counteracted or prevented.

The receiving portion(s) is/are preferably formed as a recess or opening extending into at least one of the base areas, which openings is/are preferably of a curved or sectorial shape. The receiving portion therefore more suitably extends radially though or into the base area(s) and therefore suitably forms an opening, through which the bearing area of the shock absorber can extend from the inside of the protective device outwards. The opening or recess advantageously has a curved or sectorial surface configuration. In particular, the opening or recess is of approximately semicircular-shaped design. Since the bearing area of the shock absorber extending through the recess or the opening generally also forms a curved surface, a secure connection can be provided between the protective device and the shock absorber in this area which is especially protected against dirt.

The receiving portion is advantageously provided on an axially running edge of the first base area and/or the second base area. The receiving portion—and in particular the receiving portions formed as a recess or opening—is therefore at least partially, and preferably entirely provided on an axially running edge of one or both base areas.

Two opposing receiving portions are suitably provided on at least one of the base areas. It is particularly advantageous if the opposing receiving portions have substantially the same configuration and are more advantageously formed coaxially with an axis running perpendicularly to the cylinder axis. The opposing receiving portions are more advantageously configured in such a way that their axis, on which they coaxially lie, intersects the cylinder axis.

The receiving portion preferably comprises an edge protruding radially outwards. In other words, the receiving portion is formed in such a way that it protrudes radially outwards beyond the basic shape formed by the first or second base area. This makes it possible to endow the receiving portion with an especially stable form.

Furthermore, in the operating state the receiving portion of the first base area and the receiving portion of the second base area preferably adjoin one another in such a way that they form a peripherally closed opening, through which the bearing area of the shock absorber can at least partially protrude. The receiving portions of the first base area and the second base area are advantageously at least partially provided on the axially running edge of the base areas, so that the receiving portions of the base areas do not adjoin one another in the assembly state, but adjoin or touch one another in the operating state. It is possible to arrange the receiving portions entirely in the area of the axially running edge without providing the receiving portions at the end face of the base areas. Consequently, a peripherally closed opening is formed in the operating state of the base areas. This affords an especially advantageous protection of the shock absorber against external influences.

In a preferred embodiment one of the base areas comprises at least one latching element and the other base area at least one catch, in which the latching element can engage in order to keep the protective device in the operating state. It goes without saying that one of the base areas may also comprise latching elements and catches, it being particularly advantageous if these alternate with one another and the other base area comprises matching catches and latching elements. The latching elements may be formed from hooks or clips, for example, which can be brought into engagement with corresponding catches. The latching elements and catches make it possible to keep the protective device in the operating state and to return the protective device to the assembly state when the latching elements are released from the catch. The protective device is therefore suitably designed in such a way that repeated shifting between the assembly state and the operating state is possible. In this respect the protective device is of a design suited to dismantling.

The latching element and the catch are advantageously each formed on one or on both axially running edges of the base areas. It is thus possible to create a configuration, for example, in which the swivel axis is provided on a preferably common axial edge of the base areas, whilst the latching elements and catches are provided on the other, opposite edge of the respective base area. In the case of a swivel axis running perpendicular to the cylinder axis it is particularly advantageous if the latching elements and catches are each provided on both axial edges of the two base areas.

An axially projecting strap is preferably provided on one base area, which strap at its free end can be brought into engagement with the other base area. With one of its ends, therefore, the strap is in particular integrally joined in one piece to a base area. In particular, the strap is designed in such a way that in the operating state of the protective device this strap can be brought by its free end into engagement on the other base area. For this purpose, the strap comprises means of engagement at its free end and the other base area comprises corresponding means. The strap is suitably provided at the end of the base area where or in proximity to which the receiving portion is provided.

According to the invention a shock absorber arrangement is furthermore provided, in particular a commercial vehicle shock absorber arrangement, comprising a shock absorber having a piston portion and a cylinder portion, which are longitudinally moveable in relation to one another or displaceable in one another, and a protective device, in particular one as has been described above, which comprises a first base area and a second base area, which are connected to one another in such a way that via a swivel axis they can be swiveled in relation to one another between an assembly state and an operating state, wherein the protective device can be arranged on the shock absorber in such a way that in the operating state the first base area and the second base area enclose the piston portion. In particular, the protective device is or can be secured in position relative to the shock absorber and in particular to its piston portion. In other words, when the protective device is arranged on and fitted to the shock absorber it is not possible for the protective device to shift in relation to the piston portion. For this purpose, the protective device can be fixed, in particular, to the remote end or bearing area or bearing eye of the piston portion. The protective device is designed in such a way that it radially or peripherally encloses the piston portion. Here, axially, the first base area and the second base area of the protective device suitably extend at least partially, preferably predominantly and more preferably over the entire part of that piston portion which in its extended state lies outside the cylinder portion. The protective device in the fully extended state more suitably also covers a remote end of the cylinder portion facing the piston portion.

The inside diameter of the hollow cylinder formed by the first base area and the second base area in the operating state is advantageously greater than, preferably 1.01 to 1.3 times greater than and more preferably 1.02 to 1.2 times greater than the outside diameter of the cylinder portion of the shock absorber.

It goes without saying that further advantages and features of the protective device according to the invention may also have applications in the shock absorber arrangement according to the invention.

BRIEF DESCRIPTION OF THE DRAWINGS

Further advantages and features of the invention emerge from the following description of preferred embodiments, referring to the figures attached, wherein individual features of individual embodiments may be combined with one another to form new embodiments. In the drawings.

DETAILED DESCRIPTION OF THE PREFERRED EMBODIMENTS

Figure 1:
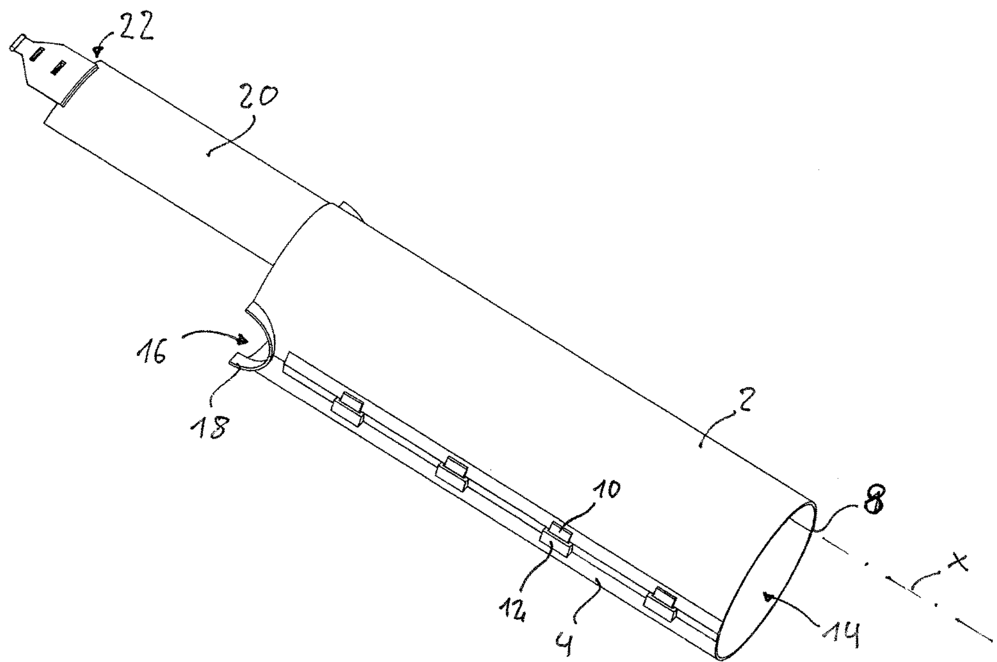
FIG. 1 shows a first preferred embodiment of a protective device according to the invention in the operating state.
Figure 2:
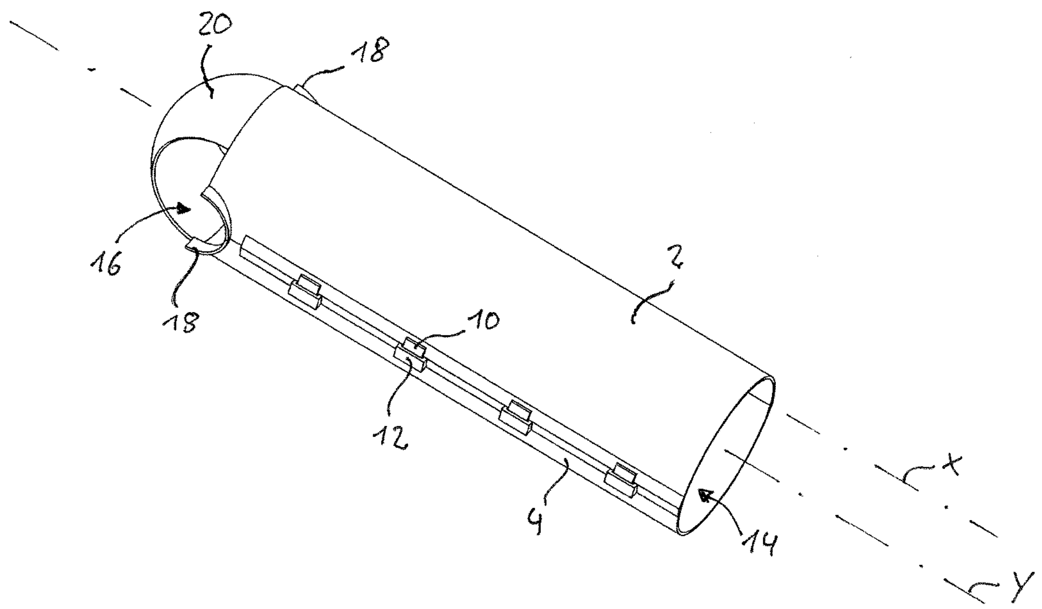
FIG. 2 shows the protective device according to FIG. 1 in the operating state.

In FIGS. 1 and 2 a first embodiment of a protective device according to the invention is represented: in the assembly state (not shown) and in the operating state (FIGS. 1 and 2). The protective device comprises a first base area 2 and a second base area 4, which can be swiveled in relation to one another via a swivel axis x.

The first base area 2 and the second base area 4 each have axially running edges 6, wherein the axially running edges 6 of the base areas 2, 4 lie substantially side by side or against one another or opposite one another in the operating state. When the first base area 2 and the second base area 4 are in the operating state they form, at least in areas, a hollow cylindrical shape, which defines a longitudinal or cylinder axis y. It is particularly suitable if the axially running edges 6 run substantially parallel to the cylinder axis y.

In order to configure the first base area 2 so that it can be swiveled or displaced in relation to the second base area 4, a hinge 8, which more advantageously may be embodied as a film hinge, is provided between them. In order to keep the protective device in the operating state, the first base area comprises a plurality of latching elements 10 on one of its axially running edges 6, which engage in corresponding catches 12.

The hollow cylinder formed by the base areas 2, 4 has an open end 14 at one of its end faces. A receiving portion 16, which serves for receiving a bearing area of the shock absorber, is formed on an area situated opposite the open end 14, in particular also at a remote end. As can be seen, the receiving portion 16 is formed on each of the base areas 2, 4 and on each of their axially running edges 6. The receiving portion 16 in each case has a sectorial geometry and is formed with an edge 18 projecting radially outwards in order to strengthen the receiving portion 16.

In order to further increase the operating reliability of the protective device, a strap 20, which comprises corresponding means of engagement at its free end 22, allowing it to engage with means of engagement on the second base area 4, is formed at the end of the first base area 2 situated opposite the open end 14. For this purpose, the strap 20 is more suitably of flexible formation, in order that it may be bent towards the second base area 4 (cf. FIG. 2).

Figure 3:
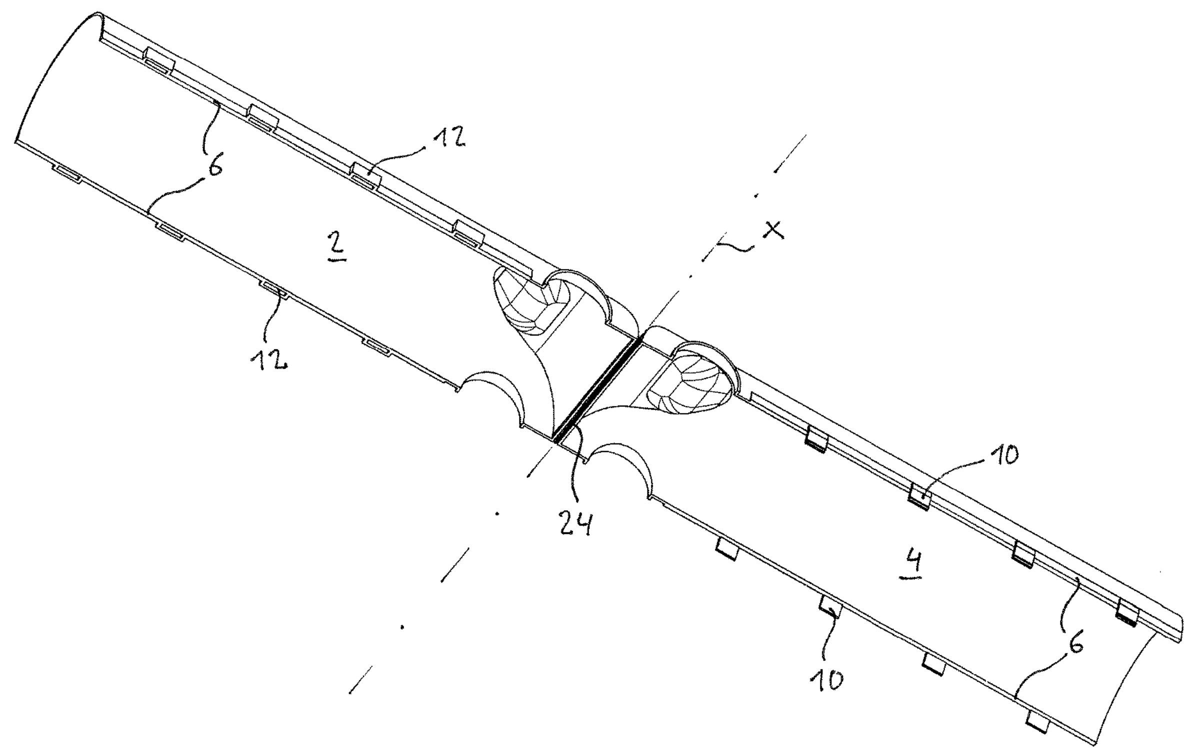
FIG. 3 shows a further embodiment of a protective device according to the invention in the assembly state.
Figure 4:
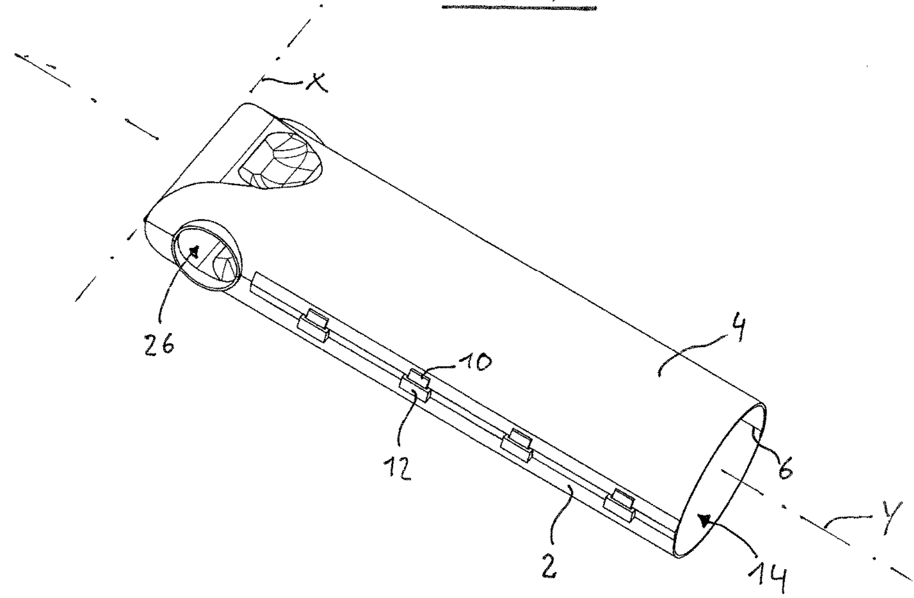
FIG. 4 shows the protective device according to FIG. 3 in the operating state.

In the embodiment of the protective device according to the invention represented in FIGS. 3 and 4, the swivel axis x does not lie parallel to the cylinder axis y but instead lies perpendicular to the cylinder axis y. In order to allow the base areas 2, 4 to swivel, a hinge 24 is therefore provided, which is formed not on the axially running edges 6 but at the at least partially closed end of the base areas 2, 4 situated opposite the open end 14.

Figure 5:
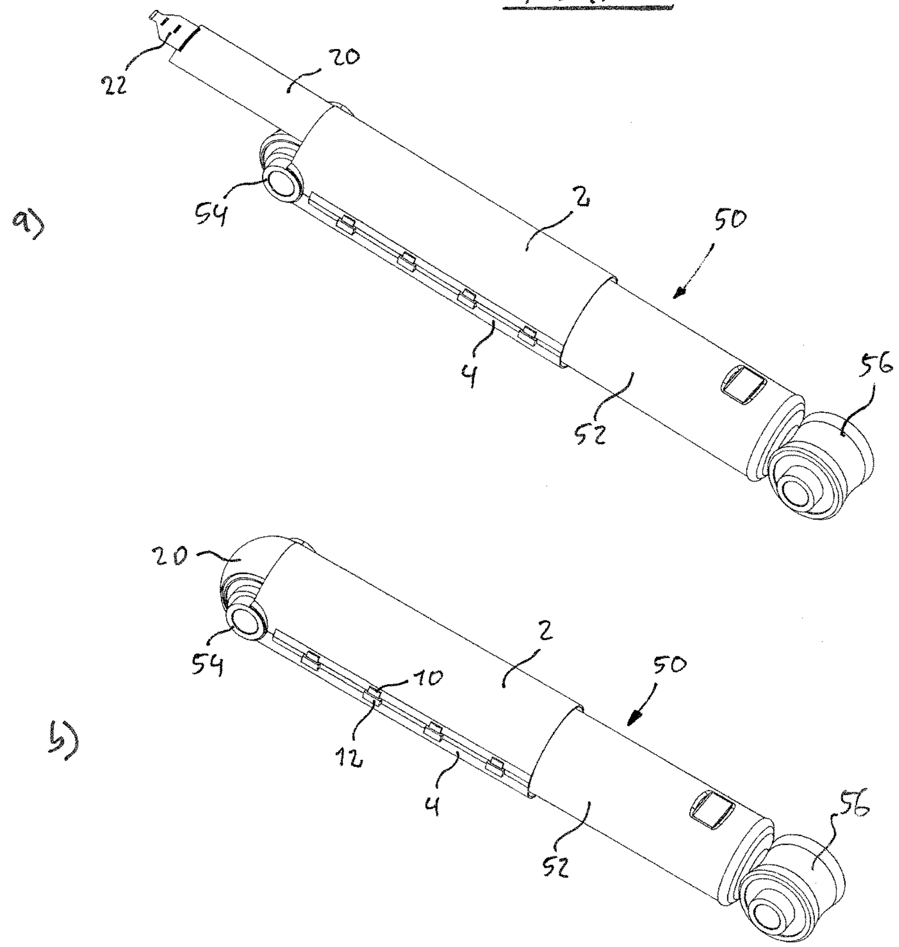
FIG. 5 show a preferred embodiment of a shock (a) and (b) absorber arrangement according to the invention.

A further difference compared to the embodiment described with reference to FIGS. 1 and 2 is that the receiving portions 16 are formed exclusively on the axially running edges 6 of the base areas 2, 4, and do not extend into the remote end of the base areas 2, 4. As shown in FIG. 5, in the operating state of the protective device the receiving portions 16 therefore form a peripherally closed opening 26.

FIG. 5 represents one embodiment of a shock absorber arrangement according to the invention. The shock absorber arrangement comprises a shock absorber 50, which has a piston portion, which is capable of retracting and extending in a cylinder portion 52. In order to fix the shock absorber 50 to the frame and chassis of the vehicle, the piston portion comprises a bearing area 54 and the cylinder portion 52 comprises a bearing area 56, which are usually embodied as mounting eyes.

In order to protect the piston portion, the first base area 2 and the second base area 4 of a protective device corresponding to the embodiment represented in FIGS. 1 and 2 enclose the piston portion in the operating state. This serves to prevent foreign bodies getting into and onto the piston portion. As can be seen, the inside diameter of the hollow cylinder formed by the first base area 2 and the second base area 4 is greater than the outside diameter of the cylinder portion 52, at least in the area of the piston portion which is able to immerse in the cylinder portion 52.

Figure 6:
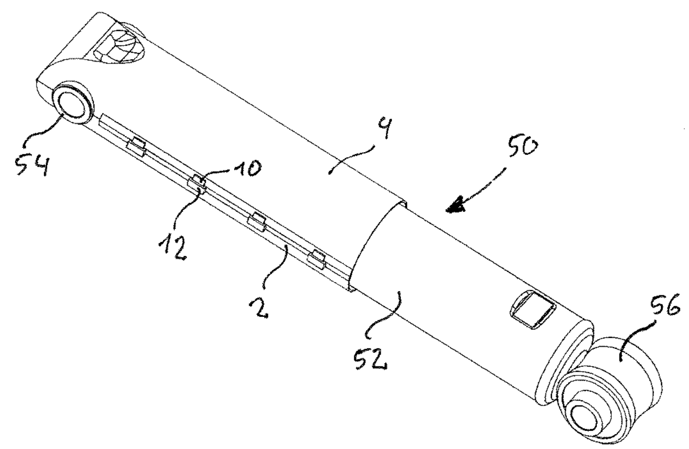
FIG. 6 shows a further preferred embodiment of a shock absorber arrangement according to the invention.

FIG. 6 represents a further embodiment of a shock absorber arrangement according to the invention. Here the first base area 2 and the second base area 4 of a protective device corresponding to the embodiment represented in FIGS. 3 and 4 enclose the piston portion in the operating state.

LIST OF REFERENCE NUMERALS

2 first base area
4 second base area
6 axially running edge
8 hinge
10 latching element
12 catch
14 open end
16 receiving portion
18 edge
20 strap
22 free end
24 hinge
26 opening
50 shock absorber
52 cylinder portion
54 bearing area
56 bearing area
x swivel axis
y cylinder axis

The invention claimed is:

1. A protective device for a shock absorber, comprising:
- a first base area; and
- a second base area;
- wherein the first base area and the second base area are connected to one another such that via a swivel axis the first base area and the second base area are configured to swivel in relation to one another between an assembly state and an operating state;
- wherein the first base area and the second base area in the operating state substantially form a hollow cylindrical shape; and
- wherein an axially projecting strap is provided on one of the base areas, the strap having a free end configured to be brought into engagement with the other base area.

2. The protective device as claimed in claim 1, wherein the first base area and the second base area are at least one of one, single piece, and connected via a hinge.

3. The protective device as claimed in claim 2, where the hinge comprises a film hinge.

4. The protective device as claimed in claim 2, wherein the swivel axis lies one of parallel and perpendicular to the cylinder axis of the hollow cylindrical shape.

5. The protective device as claimed in claim 4, further comprising:
- at least one receiving portion for receiving a bearing area of the shock absorber, which bearing area protrudes through the receiving portion, and wherein ate least one of the first base area and the second base area includes a receiving portion.

6. The protective device as claimed in claim 5, wherein the receiving portion includes at least one of a recess and an opening, extending into at least one of the base areas.

7. The protective device as claimed in claim 6, wherein the recess and/or opening is at least one of curved and sectorial shape.

8. The protective device as claimed in claim 6, wherein the receiving portion is on an axially running edge of at least one of the first base area and the second base area.

9. The protective device as claimed in claim 8, wherein two opposing receiving portions are provided on at least one of the base areas.

10. The protective device as claimed in claim 9, wherein the receiving portion comprises an edge protruding radially outwards.

11. The protective device as claimed in claim 10, wherein in the operating state the receiving portion of the first base area and the receiving portion of the second base area adjoin one another in such a way that the first base area and the second base area form a peripherally closed opening, through which the bearing area of the shock absorber is configured to at least partially protrude.

12. The protective device as claimed in claim 11, wherein one of the base areas comprises at least one latching element and the other base area at least one catch, in which the latching element is configured to engage to keep the protective device in the operating state.

13. The protective device as claimed in claim 12, wherein the latching element and the catch are each formed on one or on both axially running edges of the base areas.

14. The protective device as claimed in claim 13, wherein at least one of the first base area and the second base area has the configuration of a dish.

15. The protective device as claimed in claim 1, wherein the swivel axis lies one of parallel and perpendicular to the cylinder axis of the hollow cylindrical shape.

16. The protective device as claimed in claim 1, further comprising:
- at least one receiving portion for receiving a bearing area of the shock absorber, which bearing area protrudes through the receiving portion, and wherein ate least one of the first base area and the second base area includes a receiving portion.

17. The protective device as claimed in claim 16, wherein the receiving portion includes at least one of a recess and an opening, extending into at least one of the base areas.

18. The protective device as claimed in claim 17, wherein the recess and/or opening is at least one of curved and sectorial shape.

19. The protective device as claimed in claim 16, wherein the receiving portion is on an axially running edge of at least one of the first base area and the second base area.

20. The protective device as claimed in claim 16, wherein two opposing receiving portions are provided on at least one of the base areas.

21. The protective device as claimed in claim 16, wherein the receiving portion comprises an edge protruding radially outwards.

22. The protective device as claimed in claim 16, wherein in the operating state the receiving portion of the first base area and the receiving portion of the second base area adjoin one another in such a way that the first base area and the second base area form a peripherally closed opening, through which the bearing area of the shock absorber is configured to at least partially protrude.

23. The protective device as claimed in claim 1, wherein one of the base areas comprises at least one latching element and the other base area at least one catch, in which the latching element is configured to engage to keep the protective device in the operating state.

24. The protective device as claimed in claim 23, wherein the latching element and the catch are each formed on one or on both axially running edges of the base areas.

25. A shock absorber arrangement, comprising:

a shock absorber having a piston portion and a cylinder portion, which are at least one of longitudinally moveable in relation to one another and displaceable in one another; and a protective device as claimed in claim 1;

wherein the protective device can be arranged on the shock absorber in such a way that in the operating state the first base area and the second base area enclose the piston portion;

wherein the first base area and the second base area of the protective device axially extend over the entire part of that piston portion which in the extended state lies outside the cylinder portion;

wherein the protective device in the fully extended state covers a remote end of the cylinder portion facing the piston portion; and wherein the inside diameter of the hollow cylinder formed by the first base area and the second base area in the operating state is 1.01 to 1.3 times greater than the outside diameter of the cylinder portion of the shock absorber.

* * * * *